(12) United States Patent
Chandrasekhar et al.

(10) Patent No.: US 8,750,887 B2
(45) Date of Patent: Jun. 10, 2014

(54) MULTI-CELL SIGNALING OF CHANNEL STATE INFORMATION-REFERENCE SIGNAL AND PHYSICAL DOWNLINK SHARED CHANNEL MUTING

(75) Inventors: Vikram Chandrasekhar, Dallas, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/184,729

(22) Filed: Jul. 18, 2011

(65) Prior Publication Data

US 2012/0264441 A1 Oct. 18, 2012

Related U.S. Application Data (60) Provisional application No. 61/382,955, filed on Sep. 15, 2010, provisional application No. 61/382,633, filed on Sep. 14, 2010, provisional application No. 61/365,174, filed on Jul. 16, 2010.

(51) Int. Cl.
*H04W 72/00* (2009.01)

(52) U.S. Cl.
USPC .............. 455/450; 455/68; 455/80; 455/509; 455/67.7; 370/252

(58) Field of Classification Search
USPC ............ 455/450, 44, 67.7, 68, 80, 509; 370/252, 338
See application file for complete search history.

(56) References Cited

U.S. PATENT DOCUMENTS

| | | | |
|---|---|---|---|
| 2009/0249153 A1* | 10/2009 | Zhang | 714/748 |
| 2011/0176499 A1* | 7/2011 | Siomina et al. | 370/329 |
| 2011/0199986 A1* | 8/2011 | Fong et al. | 370/329 |
| 2011/0230144 A1* | 9/2011 | Siomina et al. | 455/68 |
| 2011/0244877 A1* | 10/2011 | Farajidana et al. | 455/452.2 |
| 2012/0106374 A1* | 5/2012 | Gaal et al. | 370/252 |
| 2012/0315859 A1* | 12/2012 | Lee et al. | 455/67.13 |

OTHER PUBLICATIONS

3GPP TSG RAN1 #57—R1-092628—Jun. 29-Jul. 3, 2009.*
3GPP TSG RAN WG1 #58—R1-093480—Shenzhen, China, Aug. 24-28, 2009.*
3GPP TSG RAN2 #70—R2-103413—Montreal, Canada, May 10-14, 2010.*
3GPP TSG RAN #47—RP-100190—Vienna, Australia, Mar. 12-16, 2010.*
3GPP TSG RAN #47—RP-100191—Vienna, Australia, Mar. 16-19, 2010.*
3GPP TSG RAN WG1 #58—R1-093793—Miyazaki, Japan, Oct. 12-16, 2009.*
"Coordinated Multipoint Trials in the Downlink"—Heinrich Hertz Institute—Jungnickel et al.—2009.*

* cited by examiner

*Primary Examiner* — Kashif Siddiqui
*Assistant Examiner* — Mong-Thuy Tran
(74) *Attorney, Agent, or Firm* — Ronald O. Neerings; Wade James Brady; Frederick J. Telecky, Jr.

(57) ABSTRACT

This invention includes signaling schemes for communicating the PDSCH muting configuration from the eNodeB to its UEs so that they can measure inter-cell CSI if configured. The base station transmits to each served user equipment a number signal indicating a number of allowed muting configurations, parameters for each allowed muting configuration and an enable/disable signal. Each served user equipment mutes or does not mute a physical downlink shared channel according to one of the allowed muting configurations and the state of a corresponding bit of the enable/disable signal.

23 Claims, 5 Drawing Sheets

MULTI-CELL SIGNALING OF CHANNEL STATE INFORMATION-REFERENCE SIGNAL AND PHYSICAL DOWNLINK SHARED CHANNEL MUTING

CLAIM OF PRIORITY

This application claims priority under 35 U.S.C. 119(e)(1) to U.S. Provisional Application No. 61/365,174 filed Jul. 16, 2010, U.S. Provisional Application No. 61/382,633 filed Sep. 14, 2010 and U.S. Provisional Application No. 61/382,955 filed Sep. 15, 2010.

TECHNICAL FIELD OF THE INVENTION

The technical field of this invention is wireless communication such as wireless telephony.

BACKGROUND OF THE INVENTION

Physical Downlink Shared CHannel (PDSCH) muting over Channel State Information Reference Signal (CSI-RS) is being studied for inclusion in the Evolved Universal Terrestrial Radio Access (E-UTRA) LTE-Advanced standard for inter-cell Channel State Information (CSI) measurement for Rel. 10. When muting is configured, PDSCH of the serving cell is muted on RE positions corresponding to non-serving cell CSI-RS. As a consequence, inter-cell CSI can be measured free from PDSCH interference from the serving cell. Muting offers two benefits. The UE can estimate its CSI to its serving cell with greater accuracy since neighboring cells silence their PDSCH transmissions on colliding REs. The UE increases its CSI accuracy to non-serving cells, which is potentially useful for increasing coverage or spatial reuse.

SUMMARY OF THE INVENTION

This invention includes signaling schemes for communicating the PDSCH muting configuration from the eNodeB to its UEs so that they can measure inter-cell CSI if configured. This application looks at various aspects of PDSCH RE muting, interference estimation and identifies high-level design guidelines while standardizing muting for Rel. 10 LTE and beyond.

It is generally recognized that legacy UE (Rel. 8/Rel. 9 LTE) performance degrades of subframes in which CSI-RS is transmitted because it is unaware that its PDSCH is punctured at RE positions on which intra-cell CSI-RS is transmitted. Further work has shown that PDSCH RE muting over inter-cell CSI-RS locations also degrades legacy UE operation. This suggests that PDSCH RE muting should be restricted to intra-cell CSI-RS subframes. Legacy UE performance is already compromised due to intra-cell CSI-RS.

While muting support is desirable for Coordinated Multi-point (CoMP), associated impact on interference estimation should be considered. Interference estimation is carried out at the UE to ascertain the true levels of interference experienced on its data REs. Accurate interference estimation should represent the interference experienced over the PDSCH and is crucial for providing accurate CQI feedback.

In Rel. 8 LTE, a UE first estimates its serving cell channel over CRS. The UE then estimates interference by subtracting the contribution of its serving cell from the received signal over CRS locations. In Rel. 10 LTE UEs may similarly estimate interference by subtracting their serving cell signal from the received signal over intra-cell and/or inter-cell CSI-RS positions. The comparatively low measurement RE density of CSI-RS using one RE/PRB/port and transmitting at most twice in each radio frame implies limited number of opportunities available for interference estimation and CSI estimation on CSI-RS.

These conflicts occur mainly for 8 TX antenna port eNodeBs for which CRS is not available on all antenna ports. At least for 2 TX and 4 TX antenna port eNodeBs, the UE may use the CRS for interference estimation. Mandating different reference symbols for interference estimation depending on the eNodeB antenna port configuration increases the UE channel estimator complexity and complicates testing.

If there is no PDSCH muting on inter-cell CSI-RS, the UE can obtain reasonably good interference estimate. This is based upon the large available reuse factor of 5 for normal CP transmission. On average one fifth of the interference seen on inter-cell CSI-RS arises from CSI-RS transmissions, while the remaining four fifths of the interference arises from PDSCH transmissions of non-serving cells.

This suggests that partial PDSCH RE muting on inter-cell CSI-RS locations will enable inter-cell CSI estimation without compromising interference estimation. Two approaches have been suggested. The first approach includes time-domain muting where PDSCH REs on inter-cell CSI-RS positions are muted over a subset of the CSI-RS bearing subframes. The second approach employs frequency domain muting wherein the PDSCH is selectively muted on certain RBs across the entire resource grid.

This invention is time-domain (subframe level) partial PDSCH muting on intra-cell CSI-RS carrying subframes. Inter-cell CSI estimation occurs on CSI-RS subframes with muting. Interference estimation occurs in CSI-RS subframes without muting. The duty cycle for PDSCH muting is preferably configured separately from the CSI-RS duty cycle. Thus PDSCH muting can occur once in two frames while CSI-RS transmissions can occur twice a frame.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
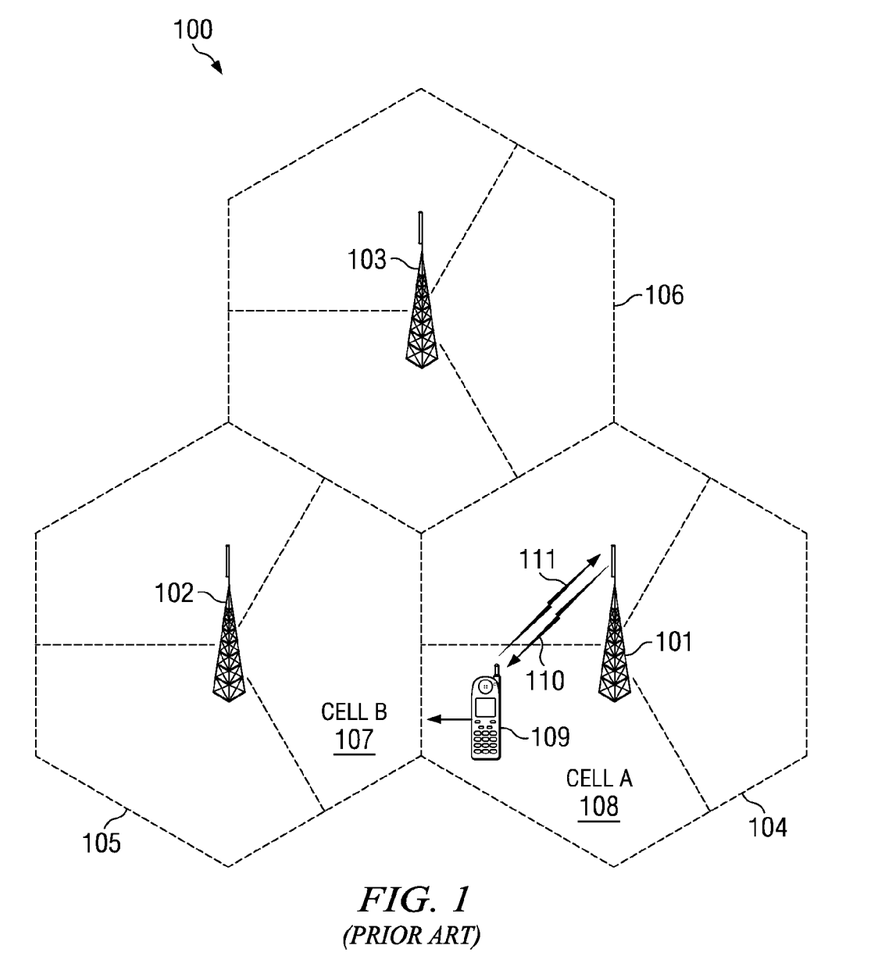
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNodeB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
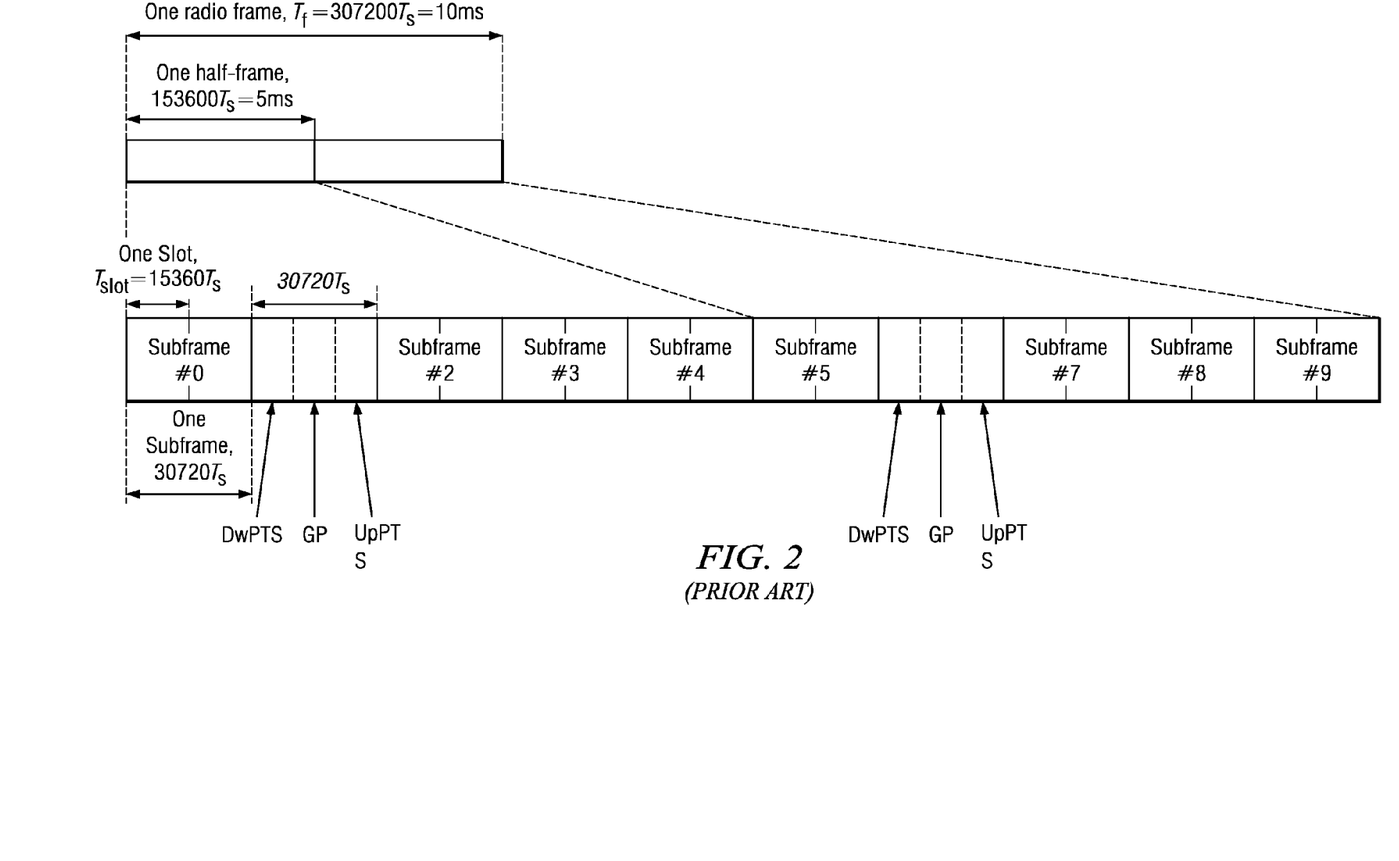
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Config- uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Physical Downlink Shared CHannel (PDSCH) muting over Channel State Information Reference Signal (CSI-RS) is being studied for inclusion in the Evolved Universal Terrestrial Radio Access (E-UTRA) LTE-Advanced standard for inter-cell Channel State Information (CSI) measurement for Rel. 10. When muting is configured PDSCH of the serving cell is muted on Resource Element (RE) positions corresponding to non-serving cell CSI-RS. Thus inter-cell CSI can be measured free from PDSCH interference from the serving cell.

This invention is signaling schemes for communicating PDSCH muting configuration from the eNodeB to its UEs so that they can measure inter-cell CSI if configured.

When PDSCH muting is configured, PDSCH of the serving cell is rate matched around the serving cell CSI-RS as well as the muted RE. This theoretically corresponds to non-serving cell CSI-RS. Thus no PDSCH transmission occurs on RE corresponding to CSI-RS of serving and non-serving cells.

A UE needs to know the PDSCH mapping position to correctly interpret the code rate and decode its PDSCH. In Rel. 8 LTE, this requirement is met since all cell-specific symbols such as Physical Broadcast CHannel (PBCH), Physical Hybrid ARQ Indicator CHannel (PHICH), Physical Control Format Indicator CHannel (PCFIC), Physical Downlink Control CHannel (PDCCH), Cell-specific Reference Signals (CRS) and UE-specific Demodulation Reference Signal (DMRS) for transmission mode 7 are known a priori to the UE.

In Rel. 10, in addition to these symbols when the UE is configured in single-cell non-Coordinated Multi-point (non-CoMP) transmission, PDSCH is rate matched around the serving cell CSI-RS. Therefore the CSI-RS of the serving cell uniquely determines the PDSCH mapping. For Rel-11 and beyond, different cells may coordinate their transmissions in a process called Coordinated Multi-Point transmission (CoMP) using techniques such as coordinated beamforming/scheduling (CB/CS) and joint processing (JP). Preferably for UE configured CB/CS, PDSCH is rate matched around the serving cell CSI-RS only. Preferably for UE configured in CoMP joint processing, PDSCH is rate matched around CSI-RS of all cells within the CoMP transmission/measurement set associated with the UE. Thus PDSCH on CSI-RS RE of the associated CoMP transmission/measurement set is muted.

A UE uses the CSI-RS of its serving cell for intra-cell CSI measurement. A UE may use CSI-RS of a non-serving cell for inter-cell CSI-RS measurement and for estimating interference. Inter-cell CSI estimation accuracy is improved by PDSCH muting which removes the PDSCH interference on CSI-RS. However muting PDSCH on inter-cell CSI-RS prevents the UE from obtaining accurate estimate of its interference from non-serving cells. An accurate interference estimate on CSI-RS is vital for PDSCH demodulation. These requirements have prompted studies on standardizing PDSCH muting to take into account the intra/inter-cell CSI-RS pattern as well as provision for interference estimation on intra-/inter-cell CSI-RS on non-muted CSI-RS subframes.

This invention makes the following proposals regarding configurations for PDSCH muting.

Proposal 1: To minimize legacy impact, PDSCH muting is carried out in intra-cell CSI-RS subframes only.

Proposal 2: The serving cell eNodeB indicates to its UE a pattern index conveying the CSI-RS pattern used for intra-cell measurement.

Proposal 3: Interference estimation on CSI-RS is considered while standardizing muting aspects. Partial subframe level PDSCH muting can facilitate CSI estimation and interference estimation on CSI-RS.

Proposal 4: Muting is carried out across the entire bandwidth on a subset of configured CSI-RS subframes. The muting duty cycle is configured separately from the CSI-RS duty cycle.

Proposal 5: Muting patterns are determined by the network and communicated to the UEs on a cell-specific basis.

Proposal 6: Muting patterns specify the following: the index set of patterns (cells) corresponds to RE locations on which the UE estimates its CSI; the index set of patterns (cells) corresponds to RE locations on which PDSCH RE muting occurs; a subframe offset relative to the starting subframe on each frame on which intra-cell CSI-RS is transmitted, which is identical to the subframe offset on which muting is carried out; the intra-cell CSI-RS duty cycle and PDSCH RE muting duty cycle is specified by the pattern where both duty cycle values are in the set {5 ms, 10 ms, 20 ms}.

Proposal 7: The muting configuration is communicated to the UE semi-statically. The may use either UE-specific Radio Resource Control (RRC) signaling on its PDSCH or as cell-specific signaling on SIB1 (PBCH).

This application uses these definitions:

PDSCH muting whether enabled or not is signaled by higher-layer parameter PDSCHmutingenabled. The UE uses this parameter to determine the CSI-RS pattern RE positions around which its PDSCH is rate-matched.

Intracell CSI-RS pattern, which is the pattern index corresponding to serving cell eNodeB, is signaled by a higher-layer parameter IntracellCSIRSpattern CSI-RS pattern for intra and inter-cell CSI measurement is signaled by a higher-layer parameters CSIRSpattern. This includes both the CSI-RS of the serving cell and of the non-serving cells. This does not preclude that CSIRSpattern only communicates the inter-cell CSI pattern configuration, while CSI-RS of serving cell is communicated separately. This separate communication could be tied to a cell identification number or via a separate higher-layer signal IntracellCSIRS-pattern.

Intra-cell CSI-RS subframe offset is signaled by a higher-layer parameter CSIRSoffset. The parameter implicitly equals the subframe offset of PDSCH RE muting.

Intra-cell CSI-RS duty cycle is signaled by a higher-layer parameter CSIRSpatterndutycycle.

PDSCH RE muting duty cycle is signaled by a higher-layer parameter PDSCHmutingdutyCycle.

PDSCHmutingenabled and CSIRSpattern may be jointly or separately signaled. If jointly signaled a UE may assume that the PDSCH muting/rate-matching pattern and CSI-RS pattern for intra/inter-cell measurement are equivalent and are signaled jointly. Thus signaling only CSIRSpattern is needed. For example, the higher layer informs the UE to perform CSI-RS measurement for CSI-RS patterns 1, 2 and 3. Correspondingly, PDSCH on CSI-RS RE of patterns 1 to 3 are muted. One exemplary use for this configuration is CoMP joint processing. If separately signaled the parameters enabling PDSCH RE muting and the CSI-RS patterns for intra/inter-cell measurement are separately communicated. For example, the CSIRSpattern may inform the UE to perform channel estimation on CSI-RS pattern 1, 2 and 3, while the parameter PDSCHmutingenabled enabled only for CSI-RS pattern 1. This may be beneficial for a UE configured in coordinated beamforming among CoMP set cell 1, 2 and 3 where cell 1 is the anchor cell.

This invention also handles reallocating the unused power from muted PDSCH REs. The options for re-allocating power from muted CSI-RS resources include: intra-cell CSI-RS; PDSCH; and Rel. 10 DMRS. Power transfer on to PDSCH requires defining new power levels in addition to existing levels. Power transfer on to Rel. 10 DMRS is awkward because DMRS is UE-specific. Thus DMRS may not be carried across entire bandwidth unlike CSI-RS. This invention transfers the unused power from muted PDSCH REs UE transparent to intra-cell CSI-RS.

This application describes proposed signaling schemes during eNodeB configuration of the UE to receive its CSI-RS including the subframe offset and duty cycle periodicity. This application also presents signaling schemes to communicate muting patterns for intra-/inter-cell CSI estimation and for determining the RE positions around which its PDSCH is rate-matched.

The higher-layer parameter CSIRSoffset is a three-bit message. The three bits indicate a subframe index belonging to the set {1, 2, 3, 6, 7, 8}. Subframes 0 and 5 may be used for transmitting broadcast information and subframes 4 and 9 may carry paging channels. Table 2 shows an exemplary coding of CSIRSoffset.

TABLE 2

| CSIRSoffset | Subframe offset |
|---|---|
| 0 0 0 | 1 |
| 0 0 1 | 2 |
| 0 1 0 | 3 |
| 0 1 1 | 6 |
| 1 0 0 | 7 |
| 1 0 1 | 8 |
| 1 1 0 | Reserved |
| 1 1 1 | Reserved |

The higher-layer parameter CSIRSpatterndutycycle which communicates the duty cycle (ms) for intra-cell CSI-RS is a two bit parameter. The two bits indicate a duty cycle value belonging to the set {5 ms, 10 ms, 20 ms}. This parameter signals the periodicity in milliseconds (ms) on which intra-cell CSI-RS pattern is transmitted. Table 3 shows an exemplary usage of CSIRSpatterndutycycle.

TABLE 3

| CSIRSpatterndutycycle | Duty cycle (ms) |
|---|---|
| 0 0 | 5 |
| 0 1 | 10 |
| 1 0 | 20 |
| 1 1 | Reserved |

Given N CSI-RS patterns within the CSI-RS subframe whose relative position is given by CSIRSoffset, the parameter PDSCHmutingdutycycle signals the duty cycle periodicity corresponding to each cell for which PDSCH muting is applied.

The higher-layer parameter PDSCHmutingdutyCycle is communicated through one of the following three schemes. In the first scheme, the PDSCHmutingdutycycle is signaled as a two bit value configuring PDSCH muting periodicity corresponding to CSI-RS pattern indices (cells) for non-serving cells only within the possible duty cycle values in the set {5 ms, 10 ms and 20 ms}. Table 4 shows an exemplary coding of PDSCHmutingdutycycle.

TABLE 4

| PDSCHmutingdutycycle | Duty cycle (ms) |
|---|---|
| 0 0 | 5 |
| 0 1 | 10 |
| 1 0 | 20 |
| 1 1 | Reserved |

If the PDSCHmutingenabled parameter is enabled for that corresponding pattern (cell), then the PDSCH REs shall be muted on the CSI-RS locations for that pattern (cell) with muting periodicity given by PDSCHmutingdutycycle. The corresponding subframe offset is determined by the parameter CSIRSoffset. The UE ascertains the periodicity of its intra-cell CSI-RS from the parameter CSIRSpatterndutycycle as described above.

In the second scheme given N CSI-RS patterns within the CSI-RS subframe whose relative position is given by CSIR-Soffset, the parameter PDSCHmutingdutycycle is used to signal the duty cycle periodicity corresponding to each cell for which PDSCH muting is applied.

Table 5 shows the available reuse factor (N) for different number of eNodeB CSI-RS antenna ports.

TABLE 5

| Configuration | 2 CSI-RS ports | 4 CSI-RS ports | 8 CSI-RS ports |
|---|---|---|---|
| Normal CP (FS1) | 20 | 10 | 5 |
| Normal CP (FS2) | 32 | 16 | 8 |
| Extended CP (FS1) | 16 | 8 | 4 |
| Extended CP (FS2) | 28 | 14 | 7 |

Figure 3:
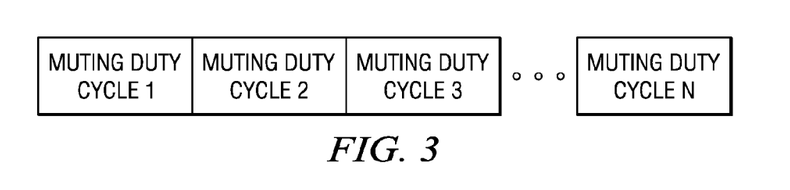
FIG. 3 illustrates an exemplary coding of PDSCHmutingdutycycle as a bit map of N 2-bit elements.

Each element corresponds to a CSI-RS pattern index (cell) and equals the muting duty cycle periodicity for that particular pattern (cell). By default, the first element corresponds to the duty cycle of the serving (anchor) cell and should therefore equal PDSCHmutingdutycycle. If the PDSCHmutingenabled parameter is enabled for that corresponding pattern (cell), then the PDSCH REs is muted for the CSI-RS locations for that pattern (cell) with muting periodicity given by PDSCHmutingdutycycle. The corresponding subframe offset is determined by the parameter CSIRSoffset. FIG. 3 illustrates this coding. In FIG. 3 N is the reuse factor or the number of available orthogonal CSI-RS patterns within the subframe carrying the CSI-RS. Given Q possible values for each element, each field requires ceil($\log_2(Q)$) bits.

Figure 4:
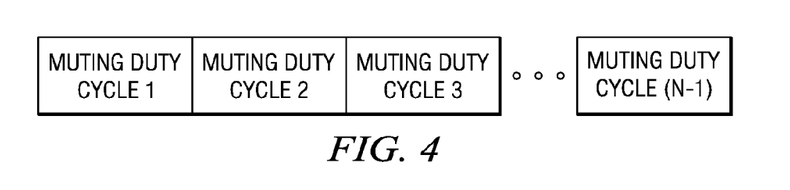
FIG. 4 illustrates an exemplary coding of PDSCHmutingdutycycle as a bit map of N−1 2-bit elements.
Figure 7:
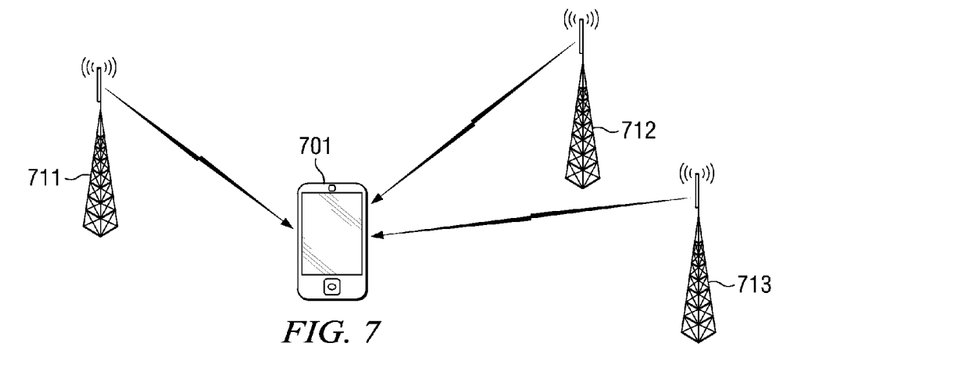
FIG. 7 illustrates a UE and three eNodeBs as used in this invention.

In the second alternative, the PDSCHmutingdutycycle is signaled as a bit map containing N−1 elements. Each of the N−1 elements takes a two-bit value assuming potential duty cycle values in the set {5 ms, 10 ms, 20 ms}) as shown above. Unlike the first alternative, each element corresponds to a CSI-RS pattern index (cell) of a non-serving cell. FIG. 7 illustrates this coding. In FIG. 4 N is the reuse factor or the number of available orthogonal CSI-RS patterns within the subframe carrying the CSI-RS. Given Q possible values for each element, each field requires ceil($\log_2(Q)$) bits.

Figure 5:
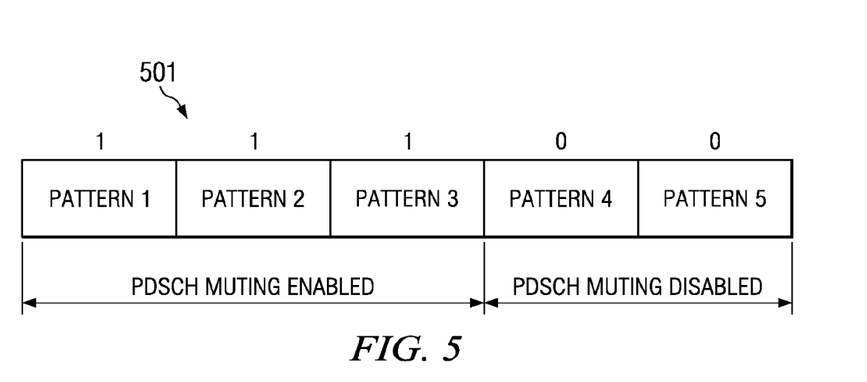
FIG. 5 illustrates an exemplary bitmap of length N signaling the PDSCH muting pattern PDSCHmutingenabled for that particular cell, where N is the re-use factor.

For the discussion below, assume that the UE obtains the pattern index of its serving cell CSI-RS from the higher layer cell-specific signaling parameter IntracellCSIRSpattern. The higher-layer parameters PDSCHmutingenabled and CSIRSpattern may be designed according to the following two alternatives. In the first alternative, a bitmap of length N, where N is the re-use factor, signals the PDSCH muting pattern PDSCHmutingenabled for that particular cell. The association between pattern and the corresponding cell is implicit and need not be separately communicated to the UE. By convention assume that the first pattern (cell) corresponds to the serving (anchor) cell to the UE of interest. FIG. 5 illustrates the corresponding result of a pattern 501 of 11100. A bit value 1 on the k-th bit position indicates that PDSCH is muted on the RE corresponding to the k-th CSI-RS pattern. A bit value 0 indicates that PDSCH is not muted (muting disabled) on the corresponding CSI-RS pattern.

Figure 6:
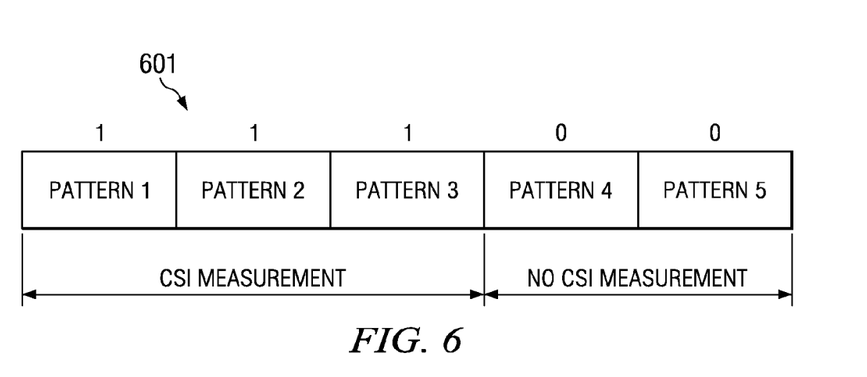
FIG. 6 illustrates a similar exemplary bit map signaling the pattern (cell) corresponding to which the UE performs CSI measurement.

As illustrated in FIG. 6 a similar bit map 601 11100 signals the pattern (cell) corresponding to which the UE performs CSI measurement (e.g. CSIRSpattern). The association between pattern and the corresponding cell is implicit and need not be separately communicated to the UE. By convention assume that the first pattern (cell) corresponds to the serving (anchor) cell to the UE of interest. A bit value 1 on the k-th bit indicates that CSI measurement is preformed for the k-th CSI-RS pattern. A bit value 0 indicates that no CSI measurement is performed for the k-th CSI-RS pattern.

The serving eNodeB signals its UE using the higher layer cell specific signaling parameter IntracellCSIRSpattern via an N length bitmap an index between 1 and N. The index value 1 represents the starting index in the bitmap. The eNodeB sets the bitmap field in both the aforementioned bitmap arrays according to the index represented by IntracellCSIR-Spattern to 1. The UE accesses the CSI-RS pattern corresponding to the bit map index given by IntracellCSIRSpattern to determine its intra-cell CSI-RS RE positions.

Alternatively, both CSIRSpattern and PDSCHmutingenabled are reduced to N−1 bits. These N−1 bits correspond to the N−1 CSI-RS base patterns other than the one associated with the serving cell. In this case, the higher layer parameter IntracellCSIRSpattern communicates to the UE the pattern index corresponding to its intra-cell CSI-RS. The UE uses the pattern index given by IntracellCSIRSpattern to determine the locations of its intra-cell CSI-RS resource elements.

An alternative uses a length-N bit map to indicate the CSI-RS measurement configuration and a length N−1 bit map for PDSCH muting. PDSCH of the serving cell is by default muted.

A 1-bit message signaled by higher layer indicates the equivalence of PDSCHmutingenabled and CSIRSpattern. If this higher layer signal is 1, the UE assumes that PDSCH muting and CSI-RS pattern for measurement occur on the same set of REs. If this bit is 0, the UE assumes that PDSCH muting and CSI-RS pattern for measurement occur on different set of REs.

In the second alternative of the design of higher-layer parameters PDSCHmutingenabled and CSIRSpattern, these parameters are designed to given N CSI-RS patterns. A higher layer informs the UE of a symbol sequence $\{L_1, L_2 \ldots L_M\}$ where $L_1 \in [1,N]$ is the CSI-RS pattern index of the serving cell and $L_k \in [1,N]$ (k>1) is the CSI-RS pattern index of the k-th non-serving cell. If $L_k$=0, then CSI-RS estimation on the k-th CSI-RS pattern is not performed. M denotes the total number of cells to perform CSI estimation. The CSI-RS pattern index of the serving cell is alternately indicated separately using IntracellCSIRSpattern. In this case, the higher layer only communicates an (M−1) length symbol sequence. The UE uses the pattern index indicated by IntracellCSIRSpattern to determine the locations of its intra-cell CSI-RS resource elements. The higher layer informs the UE of a sequence $\{T_1, T_2 \ldots T_M\}$ wherein $T_i$ for $1 \leq i \leq M$ refers to the number of CSI-RS antenna ports for cell (CSI-RS pattern) i. Optionally, a length N bit map indicates PDSCH muting corresponding to the N CSI-RS patterns. One embodiment uses a length N−1 bit map where PDSCH on the serving cell is by default muted on CSI-RS. Since there are only N CSI-RS base patterns corresponding to the available reuse factor of N, a reasonable choice assumes that M=N.

This application now lists the signaling overhead for communicating the CSI-RS pattern indices in order for the UE to perform the following functions: determining the RE locations around which its PDSCH its rate matched; determining the RE locations for CSI estimation over serving cell CSI-RS; and determining the RE locations for inter-cell CSI estimation over neighboring cell CSI-RS.

If the RE positions over which PDSCH muting is carried out is assumed equivalent to the RE positions over which CSI estimation is carried out, the overall signaling overhead is ceil[$\log_2(N*(N-1))$] where N is the available re-use factor. The signaling overhead remains the same irrespective of whether bit map signaling is employed or the indices are explicitly communicated to the UE. With an 8 port CSI-RS, the available reuse factor equals 5 (FDD), thus 5 signaling bits are required.

Assuming that the serving eNodeB signals the CSI-RS pattern index corresponding to intra-cell CSI-RS using the higher layer signaling parameter IntracellCSIRSpattern then if the serving eNodeB signals the muting pattern locations separately from the CSI-RS pattern locations over which the UE performs CSI estimation, the total signaling overhead is (2*N+1) where N is the available reuse factor for CSI-RS. The signaling overhead remains the same whether bit map signaling is employed or the indices are explicitly communicated to the UE. With an 8 port CSI-RS, the available reuse factor equals 5 (FDD), thus 11 signaling bits are required.

The following embodiments of the invention have multiple muting configurations. Multiple muting configurations provide flexibility whenever a CoMP UE is served a multitude of cells having different CSI-RS configurations such as the number of CSI-RS antenna ports, duty cycle and subframe offsets. Considering unplanned deployment scenarios such as hetnets, it may be beneficial to configure the UE for multiple muting configurations where each muting configuration corresponds to cell or a group of cells.

In a first alternate assume for that all cells are time-synchronized within one OFDM symbol and CSI-RS transmissions from all cells are overlapping on identical subframes. FIG. 7 illustrates UE 701 and eNodeBs 711, 712 and 713 used in explaining this subject matter. In FIG. 7 eNodeB 711 is CoMP cell 1 and has an offset of $O_1$ and a duty cycle of $D_1$. In FIG. 7 eNodeB 712 is CoMP cell 2 and has an offset of $O_2$ and a duty cycle of $D_2$. In FIG. 7 eNodeB 713 is CoMP cell 3 and has an offset of $O_3$ and a duty cycle of $D_3$. If the cell with the most infrequent CSI-RS transmission (cell 713 in this example) transmits CSI-RS on a certain subframe, then so does cells 711 and 712. For example cell 711 may have a CSI-RS duty cycle $D_1$=5 ms, cell 712 may have a CSI-RS duty cycle $D_2$=20 ms and cell 713 may have a CSI-RS duty cycle $D_3$=80 ms.

Because different cells are transmitting CSI-RS at differing rates, it may not be beneficial to have a single duty cycle from the UEs CSI measurement perspective. If muting occurs too often, such as once every 5 ms, then PDSCH RE muting occurs even when CoMP cells 2 and 3 are not transmitting CSI-RS. This unnecessarily increases muting overhead on PDSCH transmission and potentially increases the impact on legacy UE performance in systems operating under Rel. 8 or Rel. 9. On the other hand, if muting occurs infrequently, such as once every 80 ms, the UE can measure CSI only when all the CoMP cells are transmitting CSI-RS but the measurement frequency is constrained by the duty cycle of the cell with the slowest (most infrequent) CSI-RS transmissions.

This suggests that having multiple muting configurations, such as permitting each configuration to assign a different muting duty cycle allows UE 701 to measure its CSI for CoMP for potentially different subsets of the cooperating cells and with potentially different rates of CSI measurement for different cells.

Figure 8:
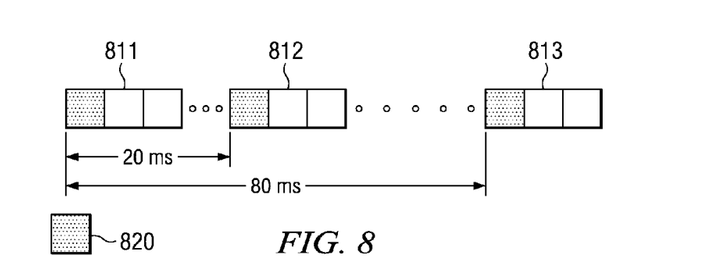
FIG. 8 illustrates multiple muting configurations permitting each configuration to assign a different muting duty cycle allowing a UE to measure its CSI for CoMP for potentially different subsets of the cooperating cells and with potentially different rates of CSI measurement for different cells.

FIG. 8 illustrates this situation. At 811 UE 701 makes a CSI measurement for cell 711. At 812 UE 701 makes a CSI measurement for cells 711 and 712. At 813 UE 701 makes a CSI measurement for cells 711, 712 and 713. At 820 UE 701 makes an intra-cell CSI-RS measurement. FIG. 8 illustrates a muting configuration corresponding to CSI-RS where $D_2$=5 ms, $D_2$=20 ms and $D_2$=80 ms.

As shown in FIG. 8 there could be two separate muting configurations. In this example the first muting configuration corresponds to a CoMP measurement (muting) duty cycle of 20 ms or once every two frames. The second muting configuration corresponds to a CoMP measurement (muting) duty cycle of 80 ms or once every eight frames. By default the UE measures its CSI to its serving cell.

Thus the UE may measure CSI to CoMP cells according to one of the following scenarios. In a first scenario the UE measures its CSI to serving cell 1111 on subframes 5 ms apart. In a second scenario the UE measures its CSI to CoMP cells 711 and 712 on subframes 20 ms apart. In a third scenario the UE measures its CSI to CoMP cells 711, 712 and 713 on subframes 80 ms apart. Thus the UE may measure subframe specific CSI to different subsets of its cooperating cells based on the muting configurations signaled to it by its primary serving cell.

In a second alternate assume that different eNodeB antenna ports are used. It is likely that the cells performing CoMP operation have different number of CSI-RS antenna ports with respect to the number of CSI-RS antenna ports of the primary serving cell for the UE of interest (cell 711 in FIG. 7). Using multiple muting configurations allows the eNodeB to flexibly allocate cells across different muting configurations. Each configuration is specified by the CoMP member cells belonging to the configuration, the duty cycle on which PDSCH muting occurs and the RE locations corresponding to the CSI-RS patterns of the CoMP member cells and the number of antenna ports for each CoMP member cell.

Figure 9:
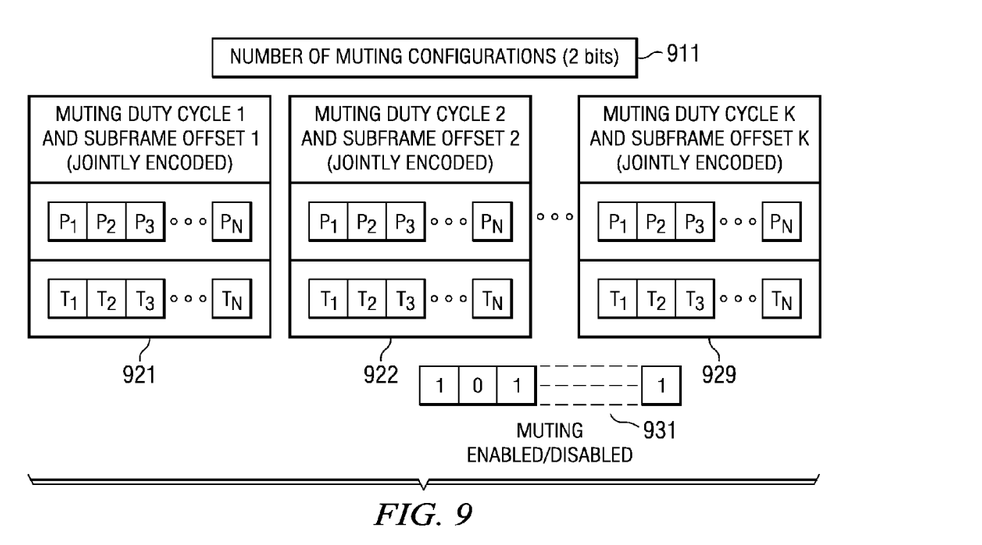
FIG. 9 illustrates the data used in this invention specifying the number of muting configurations, each muting configuration identifying plural intra-frame pattern location indices $P_i$ and plural sets of CSI-RS antenna ports $T_i$ for the corresponding CoMP cell i and a muting enable/disable data word for each configuration.

FIG. 9 illustrates the data used in this invention. Number of muting configurations identifier 911 identifies the number of muting configurations from K possible muting configurations. These muting configurations included muting configurations 921, 922 . . . 929. Each muting configuration 921, 922 . . . 929 identifies plural intra-frame pattern location indices $P_i$ for the corresponding CoMP cell i. Each muting configuration 921, 922 . . . 929 further identifies plural sets of CSI-RS antenna ports $T_i$ for the corresponding CoMP cell i. This data also includes muting enable/disable data word 931. Muting enable/disable data word 931 includes a pattern of bits corresponding to the K muting configurations. If a bit is 1, then a corresponding muting configuration is enabled. If a bit is 0, then the corresponding muting configuration is disabled.

In a embodiment of this invention the UE is configured to conduct CoMP CSI measurement on its intra-cell CSI-RS subframes. The primary serving cell (CoMP cell 711 in FIG. 7) communicates a set of muting configurations 921, 922 . . . 929 via higher layer signaling to its UE. This higher layer signaling preferably takes place via broadcast related information on System Information Block Broadcast 2 (SIB2). Alternatively, the higher layer signaling can be used with only Rel. 10 and/or Rel. 11 and beyond UEs via dedicated Radio Resource Control (RRC) signaling. These muting configurations are cell-specific. The PDSCH RE muting occurs over the entire system bandwidth, irrespective of the individual PDSCH grant (assignment) to the UE of interest.

The set of cells on which CSI measurement is carried out is determined by the muting configurations. This can vary from one CSI-RS subframe to the next and can occur at different CSI measurement rates such as once every 5 ms or once every 20 ms.

Number of muting configurations identifier 911 indicates the number of muting configurations. Suppose K=2 bits so that 4 muting configurations can be signaled to the UE. Table 6 shows an exemplary coding of muting configurations identifier 911.

TABLE 6

| 2 bit signal | Corresponding # of muting configurations |
|---|---|
| 0 0 | No muting |
| 0 1 | 1 muting configuration |
| 1 0 | 2 muting configurations |
| 1 1 | 3 muting configurations. |

As shown in Table 6 a coding 00 indicates no muting. This leaves three active muting codings. Codings 10, 10 and 11 indicate a corresponding number of muting configurations. Enabling a no muting number of configurations is useful in an unsynchronized LTE network where muting will not benefit CSI measurement.

Data word 931 signals to the UE whether or not each muting configuration is enabled/disabled. Thus data word 931 has a length equal to the number of different muting configurations supported. For data word 931 a value of 1 at position i indicates to the UE muting configuration i is enabled. A value of 0 at position i indicates to the UE muting configuration i is disabled.

Each muting configuration includes a jointly encoded muting duty cycle and subframe offset. PDSCH muting occurs on the CSI-RS RE positions according to this muting duty cycle on subframes corresponding to the subframe offset. The muting duty cycle value for a given configuration is an integer multiple of the CSI-RS duty cycle for all cells to which the UE measures its CSI within that configuration.

Each muting configuration includes the number of CSI-RS antenna ports per cell denoted by $T_i$ in FIG. 9 on whose locations the PDSCH RE muting occurs.

Figure 10:
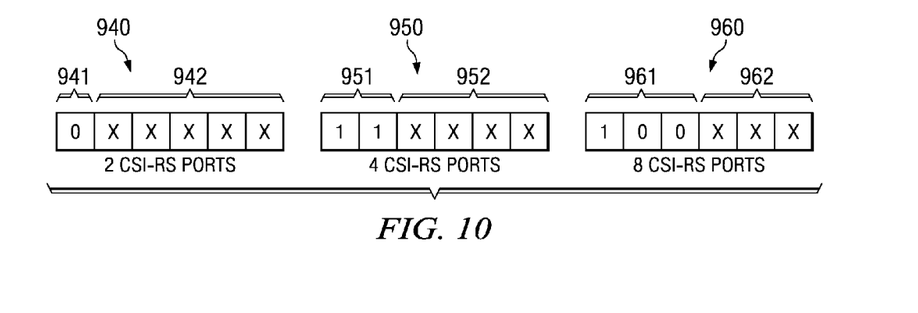
FIG. 10 illustrates coding the number of CSI-RS antenna ports/cell and intra-subframe pattern locations for a jointly encoded CoMP cell.

Each muting configuration includes the intra-subframe pattern locations for each cell denoted by $P_i$ in FIG. 9 on whose locations the PDSCH RE muting occurs. In one embodiment the number of CSI-RS antenna ports/cell (either 2, 4 or 8 TX ports) and intra-subframe pattern locations (32 patterns for 2 TX, 16 patterns for 4 TX and 8 patterns for 8 TX) for that CoMP cell are jointly encoded. This is illustrated in FIG. 13. FIG. 10 illustrates a payload size equals of 6 bits. FIG. 10 illustrates word 940 for the 2 TX case, word 950 for the 4 TX case and word 960 for the 8 TX case. Bits 941, 951 and 961 indicate the number of CSI-RS ports. Bits 942, 952 and 962 indicate the intra-subframe location. Alternatively, the number of CSI-RS antenna ports/cell and intra-subframe pattern locations could be separately encoded. The resultant payload size is 7 bits.

Figure 11:
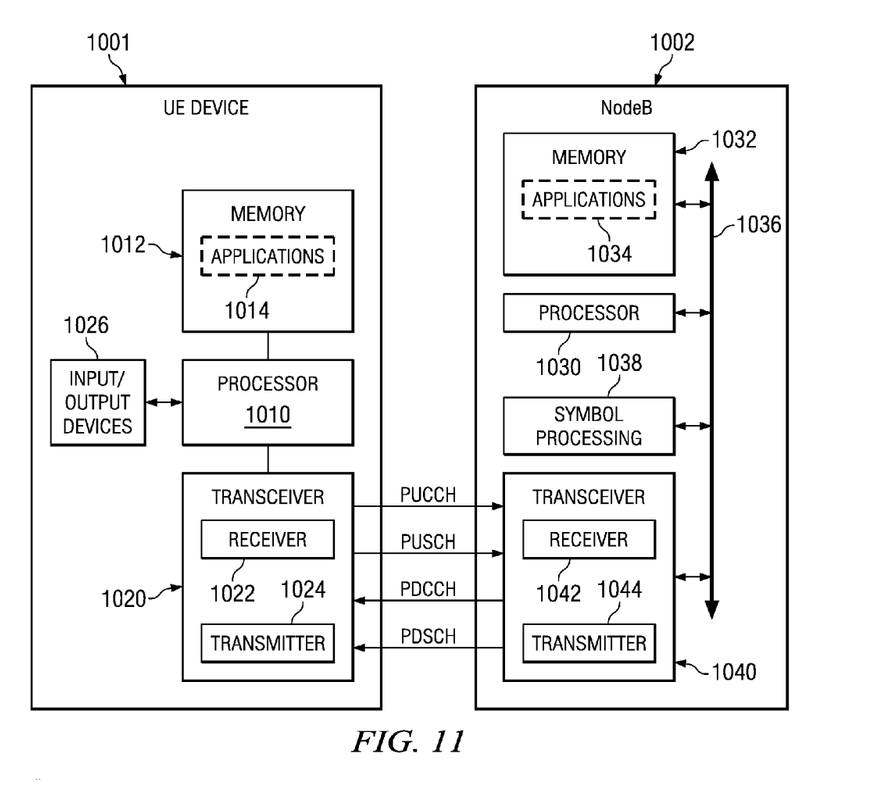
FIG. 11 is a block diagram illustrating internal details of a base station and a user equipment in the network system of FIG. 1 suitable for implementing this invention.

FIG. 11 is a block diagram illustrating internal details of an eNodeB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNodeB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNodeB (base station) 1002 periodically or continuously via the transceiver 1020. In at least some embodiments, the mobile UE 1001 identifies a Quality of Service (QoS) requirement when requesting an uplink resource from eNodeB 1002. In some cases, the QoS requirement may be implicitly derived by eNodeB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNodeB. In this case, it sends a random access signal. As part of this procedure, it determines a preferred size for the next data transmission, referred to as a message, by using a power threshold value provided by the serving eNodeB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNodeB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNodeB 1002 to manage transmissions to or from mobile UE 1001.

Transceiver 1040 comprises an uplink Resource Manager, which enables eNodeB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNodeB 1002 and at least one transmitter 1044 for transmitting data and control information to the various UEs within range of eNodeB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNodeB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNodeB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNodeB 1002 schedules an appropriate set of resources and notifies UE 1001 with a resource grant.

What is claimed is:

1. A method of scheduling physical downlink shared channel muting in a telephonic system including plural base stations, each base station serving at least one user equipment, the method comprising the steps of:
  receiving from a base station a signal indicating parameters for at least one muting configuration;
  receiving from the base station an enable/disable signal having a number of bits equal to the number of muting configurations, wherein the parameters for each muting configuration include a corresponding muting periodicity and a corresponding subframe offset, the muting periodicity and the subframe offset being jointly encoded;
  determining that a physical downlink shared channel from the base station is muted according to one of the muting configurations if a corresponding bit of the enable/disable signal has a first digital state; and
  determining that a physical downlink shared channel from the base station is not muted according to one of the muting configurations if a corresponding bit of the enable/disable signal has a second digital state opposite to the first digital state.

2. The method of claim 1, wherein:
  the muting periodicity of each muting configuration is an integer multiple of a periodicity of a Channel State Information Reference Signal for all base stations to which a user equipment measures a Channel State Information.

3. The method of claim 1, wherein:
  the parameters for each muting configuration include plural intra-frame pattern location indices $P_i$, each intra-frame pattern location index $P_i$ corresponding to a primary serving cell Coordinated Multi-point cell i for the served user equipment.

4. The method of claim 1, wherein:
  the parameters for each muting configuration include plural sets of Channel State Information Reference Signal antenna ports $T_i$, each Channel State Information Reference Signal antenna ports $T_i$ corresponding to a primary serving cell Coordinated Multi-point cell i for the served user equipment.

5. A method of scheduling physical downlink shared channel muting in a telephonic system including plural base stations, each base station serving at least one user equipment, the method comprising the steps of:
  receiving from a base station a signal indicating parameters for at least one muting configuration;
  receiving from the base station an enable/disable signal having a number of bits equal to the number of muting configurations wherein the parameters for each muting configuration include plural intra-frame pattern location indices $P_i$, each intra-frame pattern location index $P_i$ corresponding to a primary serving cell Coordinated Multi-point cell i and plural sets of Channel State Information Reference Signal antenna ports $T_i$ for the served user equipment, each Channel State Information Reference Signal antenna ports $T_i$ corresponding to a primary serving cell Coordinated Multi-point cell i for the served user equipment, the intra-frame pattern location index $P_i$ and the Channel State Information Reference Signal antenna ports $T_i$ being jointly encoded;
  determining that a physical downlink shared channel from the base station is muted according to one of the muting configurations if a corresponding bit of the enable/disable signal has a first digital state; and
  determining that a physical downlink shared channel from the base station is not muted according to one of the muting configurations if a corresponding bit of the enable/disable signal has a second digital state opposite to the first digital state.

6. A method of scheduling physical downlink shared channel muting in a telephonic system including plural base stations, each base station serving at least one user equipment, the method comprising the steps of:
  receiving from a base station a signal indicating parameters for at least one muting configuration;
  receiving from the base station an enable/disable signal having a number of bits equal to the number of muting configurations,
  wherein the parameters for each muting configuration include plural infra-frame pattern location indices $P_i$, each intra-frame pattern location index $P_i$ corresponding to a primary serving cell Coordinated Multi-point cell i and plural sets of Channel State Information Reference Signal antenna ports $T_i$ for the served user equipment, each Channel State Information Reference Signal antenna ports $T_i$ corresponding to a primary serving cell Coordinated Multi-point cell i for the served user equipment, the intra-frame pattern location index $P_i$ and the Channel State Information Reference Signal antenna ports $T_i$ being jointly encoded, wherein the base station includes two Channel State Information Reference Signal ports and the joint encoding of the intra-frame pattern location index $P_i$ and the Channel State Information Reference Signal antenna ports $T_i$ includes six bits, one bit indicating the number of Channel State Information Reference Signal ports and five bits indicating the intra-frame location index;

determining that a physical downlink shared channel from the base station is muted according to one of the muting configurations if a corresponding bit of the enable/disable signal has a first digital state; and determining that a physical downlink shared channel from the base station is not muted according to one of the muting configurations if a corresponding bit of the enable/disable signal has a second digital state opposite to the first digital state.

7. A method of scheduling physical downlink shared channel muting in a telephonic system including plural base stations, each base station serving at least one user equipment, the method comprising the steps of:

receiving from a base station a signal indicating parameters for at least one muting configuration;

receiving from the base station an enable/disable signal having a number of bits equal to the number of muting configurations, wherein the parameters for each muting configuration include plural intra-frame pattern location indices $P_i$, each intra-frame pattern location index $P_i$ corresponding to a primary serving cell Coordinated Multi-point cell i and plural sets of Channel State Information Reference Signal antenna ports $T_i$ for the served user equipment, each Channel State Information Reference Signal antenna ports $T_i$ corresponding to a primary serving cell Coordinated Multi-point cell i for the served user equipment, the intra-frame pattern location index $P_i$ and the Channel State Information Reference Signal antenna ports $T_i$ being jointly encoded, wherein the base station includes four Channel State Information Reference Signal ports and the joint encoding of the intra-frame pattern location index $P_i$ and the Channel State Information Reference Signal antenna ports $T_i$ includes six bits, two bits indicating the number of Channel State Information Reference Signal ports and four bits indicating the intra-frame location index;

determining that a physical downlink shared channel from the base station is muted according to one of the muting configurations if a corresponding bit of the enable/disable signal has a first digital state; and determining that a physical downlink shared channel from the base station is not muted according to one of the muting configurations if a corresponding bit of the enable/disable signal has a second digital state opposite to the first digital state.

8. A method of scheduling physical downlink shared channel muting in a telephonic system including plural base stations, each base station serving at least one user equipment, the method comprising the steps of:

receiving from a base station a signal indicating parameters for at least one muting configuration;

receiving from the base station an enable/disable signal having a number of bits equal to the number of muting configurations, wherein the parameters for each muting configuration include plural intra-frame pattern location indices $P_i$, each intra-frame pattern location index $P_i$ corresponding to a primary serving cell Coordinated Multi-point cell i and plural sets of Channel State Information Reference Signal antenna ports $T_i$ for the served user equipment, each Channel State Information Reference Signal antenna ports $T_i$ corresponding to a primary serving cell Coordinated Multi-point cell i for the served user equipment, the intra-frame pattern location index $P_i$ and the Channel State Information Reference Signal antenna ports $T_i$ being jointly encoded, wherein the base station includes eight Channel State Information Reference Signal ports and the joint encoding of the intra-frame pattern location index $P_i$ and the Channel State Information Reference Signal antenna ports $T_i$ includes six bits, three bits indicating the number of Channel State Information Reference Signal ports and three bits indicating the intra-frame location index;

determining that a physical downlink shared channel from the base station is muted according to one of the muting configurations if a corresponding bit of the enable/disable signal has a first digital state; and determining that a physical downlink shared channel from the base station is not muted according to one of the muting configurations if a corresponding bit of the enable/disable signal has a second digital state opposite to the first digital state.

9. A method of scheduling channel state information reference signal measurement in a telephonic system including plural base stations, each base station serving at least one user equipment, the method comprising the steps of:

receiving from a base station a muting enable/disable signal indicating each muting configuration is enabled or disabled, wherein the parameters for each muting configuration include a corresponding muting periodicity and a corresponding subframe offset, the muting periodicity and the subframe offset being jointly encoded;

receiving from the base station transmitting a measurement enable/disable signal indicating each measurement configuration is enabled or disabled;

a served user equipment not receiving a channel state information reference signal according to one of the muting configurations if the muting enable/disable signal indicates the corresponding muting configuration is enabled;

the served user equipment receiving a channel state information reference signal according to one of the muting configurations if the muting enable/disable signal indicates the corresponding muting configuration is disabled;

the served user equipment measuring a channel state information reference signal according to one of the measurement configurations if the measurement enable/disable signal indicates the corresponding measurement configuration is enabled; and the served user equipment not measuring a channel state information reference signal according to one of the measurement configurations if the measurement enable/disable signal indicates the corresponding measurement configuration is disabled.

10. The method of claim 9, further comprising:

the measurement enable/disable signal is a symbol sequence $\{L_1, L_2 \ldots L_M\}$ where $L_1 \in [1,N]$ is a channel state information reference signal pattern index of a serving cell and $L_k \in [1,N]$ for k>1 is a channel state information reference signal pattern index of the k-th non-serving cell; and each served user equipment not measuring a channel state information reference signal for the k-th measurement configuration if $L_k=0$.

11. The method of claim 9, wherein:
each muting configuration includes plural sets of Channel State Information Reference Signal antenna ports $T_i$, each Channel State Information Reference Signal antenna ports $T_i$ corresponding to a primary serving cell Coordinated Multi-point cell i for the served user equipment.

12. A method of scheduling Channel State Information Reference Signal measurement in a telephonic system including plural base stations, each base station serving at least one user equipment, the method comprising the steps of:
receiving from the base station a measurement enable/disable signal indicating a measurement configuration is enabled or disabled, wherein the parameters for each measurement configuration include a corresponding measurement periodicity and a corresponding subframe offset, the measurement periodicity and the subframe offset being jointly encoded;
receiving and measuring a Channel State Information Reference Signal according to one of the measurement configurations if the measurement enable/disable signal indicates the corresponding measurement configuration is enabled;
not measuring a Channel State Information Reference Signal according to one of the measurement configurations if the measurement enable/disable signal indicates the corresponding measurement configuration is disabled; and
transmitting feedback to the base station partly based upon said measuring.

13. The method of claim 12, further comprising:
the served user equipment receives a second measurement enable/disable signal indicating a different measurement configuration is enabled or disabled.

14. The method of claim 12, wherein:
the measurement periodicity of each measurement configuration is an integer multiple of a periodicity of a Channel State Information Reference Signal for all base stations to which a user equipment measures a Channel State Information.

15. The method of claim 12, wherein:
each measurement configuration includes plural sets of Channel State Information Reference Signal antenna ports $T_i$, each Channel State Information Reference Signal antenna ports $T_i$ corresponding to a primary serving cell Coordinated Multi-point cell i for the user equipment.

16. A method of scheduling Channel State Information Reference Signal measurement in a telephonic system including plural base stations, each base station serving at least one user equipment, the method comprising the steps of:
receiving from the base station a measurement enable/disable signal indicating a measurement configuration is enabled or disabled wherein the measurement enable/disable signal is a symbol sequence $\{L_1, L_2 \ldots L_M\}$ where $L_1 \in [1,N]$ is the channel state information reference signal pattern index of the serving cell and $L_k \in [1,N]$ for k>1 is the channel state information reference signal pattern index of the k-th non-serving cell and each user equipment not measuring a channel state information reference signal for the k-th measurement configuration if $L_k=0$;
receiving and measuring a Channel State Information Reference Signal according to one of the measurement configurations if the measurement enable/disable signal indicates the corresponding measurement configuration is enabled;
not measuring a Channel State Information Reference Signal according to one of the measurement configurations if the measurement enable/disable signal indicates the corresponding measurement configuration is disabled; and
transmitting feedback to the base station partly based upon said measuring.

17. A method of scheduling Channel State Information Reference Signal measurement in a telephonic system including plural base stations, each base station serving at least one user equipment, the method comprising the steps of:
receiving from the base station an enable/disable signal indicating a measurement configuration is enabled or disabled, wherein the parameters for each measurement configuration include a corresponding measurement periodicity and a corresponding subframe offset, the measurement periodicity and the subframe offset being jointly encoded;
receiving and measuring a Channel State Information Reference Signal according to one of the measurement configurations when the enable/disable signal indicates the corresponding measurement configuration is enabled; and
transmitting feedback to the base station partly based upon said measuring.

18. The method of claim 17, wherein:
receiving from the base station further comprises a signal indicating the parameters for each muting configuration.

19. The method of claim 18, wherein:
the parameters for each muting configuration include a corresponding muting periodicity.

20. The method of claim 19, wherein:
the muting periodicity of each muting configuration is an integer multiple of a periodicity of a Channel State Information Reference Signal for all base stations to which a user equipment measures a Channel State Information Reference signal.

21. The method of claim 18, wherein:
the parameters for each muting configuration include plural intra-frame pattern location indices $P_i$, each intra-frame pattern location index $P_i$ corresponding to a primary serving cell Coordinated Multi-point cell i for the served user equipment.

22. The method of claim 18, wherein:
the parameters for each muting configuration include plural sets of Channel State Information Reference Signal antenna ports $T_i$, each Channel State Information Reference Signal antenna ports $T_i$ corresponding to a primary serving cell Coordinated Multi-point cell i for the served user equipment.

23. A method of scheduling Channel State Information Reference Signal measurement in a telephonic system including plural base stations, each base station serving at least one user equipment, the method comprising the steps of:
receiving from the base station an enable/disable signal indicating a measurement configuration is enabled or disabled, wherein receiving from the base station further comprises a signal indicating the parameters for each muting configuration, wherein the parameters for each muting configuration include plural intra-frame pattern location indices $P_i$, each intra-frame pattern location index $P_i$ corresponding to a primary serving cell Coordinated Multi-point cell i and plural sets of Channel State Information Reference Signal antenna ports $T_i$ for the served user equipment, each Channel State Information Reference Signal antenna ports $T_i$ corresponding to a primary serving cell Coordinated Multi-point cell i for the served user equipment, the intra-frame pattern location index $P_i$ and the Channel State Information Reference Signal antenna ports $T_i$ being jointly encoded;

receiving and measuring a Channel State Information Reference Signal according to one of the measurement configurations if the enable/disable signal indicates the corresponding measurement configuration is enabled;

measuring the residual signal at a Channel State Information Reference Signal resource element according to one of the measurement configurations if the enable/disable signal indicates the corresponding measurement configuration is disabled; and transmitting feedback to the base station partly based upon said measuring.

\* \* \* \* \*